(12) United States Patent
Pal et al.

(10) Patent No.: US 11,201,524 B2
(45) Date of Patent: Dec. 14, 2021

(54) MOTOR COOLING SYSTEMS

(71) Applicant: Hamilton Sundstrand Corporation, Charlotte, NC (US)

(72) Inventors: Debabrata Pal, Hoffman Estates, IL (US); John H. Paliulis, South Windsor, CT (US); Christina W. Millot, Wilbraham, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 79 days.

(21) Appl. No.: 16/453,296

(22) Filed: Jun. 26, 2019

(65) Prior Publication Data
US 2020/0412205 A1 Dec. 31, 2020

(51) Int. Cl.
| | |
|---|---|
| *H02K 9/10* | (2006.01) |
| *F04D 29/58* | (2006.01) |
| *F04B 39/06* | (2006.01) |
| *F04F 5/20* | (2006.01) |
| *B64D 37/32* | (2006.01) |

(52) U.S. Cl.
CPC .............. *H02K 9/10* (2013.01); *B64D 37/32* (2013.01); *F04B 39/06* (2013.01); *F04D 29/584* (2013.01); *F04D 29/5806* (2013.01); *F04F 5/20* (2013.01)

(58) Field of Classification Search
CPC ...... F04F 5/20; F04D 29/5806; F04D 29/584; F04B 39/06; H02K 9/10
USPC .............................. 417/76, 84, 87–89; 310/62
See application file for complete search history.

(56) References Cited

U.S. PATENT DOCUMENTS

| | | | | |
|---|---|---|---|---|
| 3,744,935 | A * | 7/1973 | Magni | F04D 29/5886 417/370 |
| 5,980,218 | A * | 11/1999 | Takahashi | F04D 17/12 417/243 |
| 9,457,908 | B2 | 10/2016 | Surawski | |
| 2014/0331692 | A1 | 11/2014 | Eowsakul | |
| 2016/0040915 | A1* | 2/2016 | Jonsson | F25B 31/008 62/498 |
| 2017/0137498 | A1 | 5/2017 | Wollacott et al. | |
| 2018/0094626 | A1* | 4/2018 | Kobayashi | F04D 29/5846 |

FOREIGN PATENT DOCUMENTS

| | | |
|---|---|---|
| EP | 3401223 A1 | 11/2018 |
| JP | S5852949 A | 3/1983 |
| SE | 519324 C2 | 2/2003 |
| WO | 17137498 A1 | 8/2017 |
| WO | WO 2018/205002 A1 * | 11/2018 |

OTHER PUBLICATIONS

Extended European Search Report dated Jun. 22, 2020, issued during the prosecution of European Patent Application No. EP 19213357.7.

* cited by examiner

*Primary Examiner* — Charles G Freay
(74) *Attorney, Agent, or Firm* — Locke Lord LLP; Daniel J. Fiorello; Gabrielle L. Gelozin

(57) ABSTRACT

A system can include a compressor outlet line configured to receive compressor outlet flow from a compressor, a bypass line in fluid communication with the compressor outlet line and a motor outlet line to divert a bypass flow of the compressor outlet flow. The system can include at least one pump in fluid communication between the bypass line and the motor outlet line such that the bypass flow at least partially drives the pump to pull cooling flow through a motor to cool the motor.

10 Claims, 6 Drawing Sheets

| SL 103°F TAXI | | BASELINE | MC EJECTOR |
|---|---|---|---|
| Description | Units | Static | Static |
| Altitude | ft | 0 | 0 |
| Mach | | 0.00 | 0.00 |
| Ambient Temperature | °F | 103.0 | 103.0 |
| Ambient Pressure | psia | 14.7 | 14.7 |
| Ambient Humidity | gr/lb-air | 133.0 | 133.0 |
| Cargo Discharge | | | |
| Flow | lb/min | 28.6 | 26.9 |
| Pressure | psia | 14.7 | 14.7 |
| Temperature | °F | 106.0 | 106.0 |
| Compressor Stage 1 | | | |
| Outlet Flow | lb/min | 28.6 | 26.9 |
| Outlet Pressure | psia | 29.0 | 28.5 |
| Outlet Temperature | °F | 277.1 | 269.3 |
| Motor Cooling Ejector Flow | lb/min | | 6.7 |
| ASM | | | |
| Inlet Flow | lb/min | 8.5 | 8.1 |
| Inlet Pressure | psia | 46.0 | 44.7 |
| Inlet Temperature | °F | 205.0 | 205.0 |
| NEA/Flow | lb/min | 1.8 | 1.7 |
| %O2 | | 5.5 | 5.5 |
| Motor Cooling | | | |
| Motor Input Power | KW | 34.0 | 30.6 |
| Gap Flow | lb/min | 3.1 | 4.4 |
| Gap Pressure | psia | 21.6 | 27.3 |
| Gap Inlet Temperature | °F | 231.3 | 177.8 |
| Stator Flow | lb/min | 9.4 | 4.5 |
| Stator Inlet Pressure | psia | 15.56 | 14.67 |
| Stator Outlet Pressure | psia | 15.02 | 14.20 |
| Stator Inlet Temperature | °F | 215.7 | 103.0 |
| Ejector Outlet Flow | lb/min | 14.8 | 18.1 |
| Ejector Outlet Pressure | psia | 14.93 | 15.01 |
| Ejector Outlet Temperature | °F | 257.6 | 226.5 |
| Ram | | | |
| Total Inlet Flow | lb/min | 16.5 | 18.9 |
| Inlet Temperature | °F | 103.0 | 103.0 |
| Stator Flow | lb/min | 0.0 | 4.5 |
| Motor Cooler Flow | lb/min | 4.7 | 4.2 |
| Intercooler/Main Hx Flow | lb/min | 11.8 | 10.2 |
| Hx Outlet Pressure | psia | 14.61 | 14.61 |
| Ram Ejector Outlet Pressure | psia | 14.76 | 14.76 |

*Fig. 4*

MOTOR COOLING SYSTEMS

FIELD

This disclosure relates to motor cooling systems, e.g., for aircraft nitrogen generation system motors.

BACKGROUND

In traditional nitrogen generating systems (NGS), e.g., for inerting aircraft fuel tanks, a motor driven compressor (MDC) is used. A motor dissipates heat from stationary and rotating electromagnetic components. The motor is cooled by airflow over the electromagnetic components. The motor uses two cooling sources that uses two cooling ports. The first port uses ram air. The second port uses pressurized first compressor outlet flow. Pressurized first compressor outlet air is relatively hot and motor cooling can be ineffective at low ram air speeds and/or high ram air temperatures (e.g., during hot day taxi and low altitude descent).

Such conventional methods and systems have generally been considered satisfactory for their intended purpose. However, there is still a need in the art for improved motor cooling systems. The present disclosure provides a solution for this need.

SUMMARY

A system can include a compressor outlet line configured to receive compressor outlet flow from a compressor, a bypass line in fluid communication with the compressor outlet line and a motor outlet line to divert a bypass flow of the compressor outlet flow. The system can include at least one pump in fluid communication between the bypass line and the motor outlet line such that the bypass flow at least partially drives the pump to pull cooling air flow through a motor to cool the motor.

The pump can be a passive pump that has no moving parts. For example, the pump can be an ejector pump configured to create a pressure drop by effusing bypass flow into or downstream of the motor outlet line. Any other suitable pump is contemplated herein. The cooling flow can be drawn from ram air flow.

In certain embodiments, the system can include at least one valve disposed between the compressor outlet line and the bypass line. For example, the valve can be disposed on the bypass line.

The valve can be configured to modify bypass flow. For example, the valve is configured to turn bypass flow on or off. The valve can be configured to meter bypass flow.

In certain embodiments, the system can include the motor and the compressor. The compressor can be connected to the motor to be driven by the motor, for example. In certain embodiments, the system can include a heat exchanger in fluid communication with the compressor outlet line. In certain embodiments, the system can include a second compressor connected to the motor to be driven by the motor and in fluid communication with the heat exchanger to receive flow from the heat exchanger. In certain embodiments, the system can include a ram air inlet line in fluid communication with the motor such that air passes from the ram air inlet line, through the motor, to the motor outlet line to receive heat at least from motor stator windings.

In accordance with at least one aspect of this disclosure, a method can include bleeding compressor air from a compressor outlet line to drive at least one pump configured to pull cooling flow through a motor. The method can include driving a compressor in fluid communication with the compressor outlet line using the motor. The pump can be any pump disclosed herein, e.g., described above, for example.

In certain embodiments, the method can include controlling at least one valve to modify an amount of bleeding of compressor air. In certain embodiments, the method can include pulling ram air through the motor using the pump.

In certain embodiments, the method can include fully opening the valve on when on the ground. The method can include closing the valve (e.g., at least partially if not fully) when in flight.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 shows thermal analysis assumptions for thermal analysis of one or more embodiments of a system;

DETAILED DESCRIPTION

Figure 1:
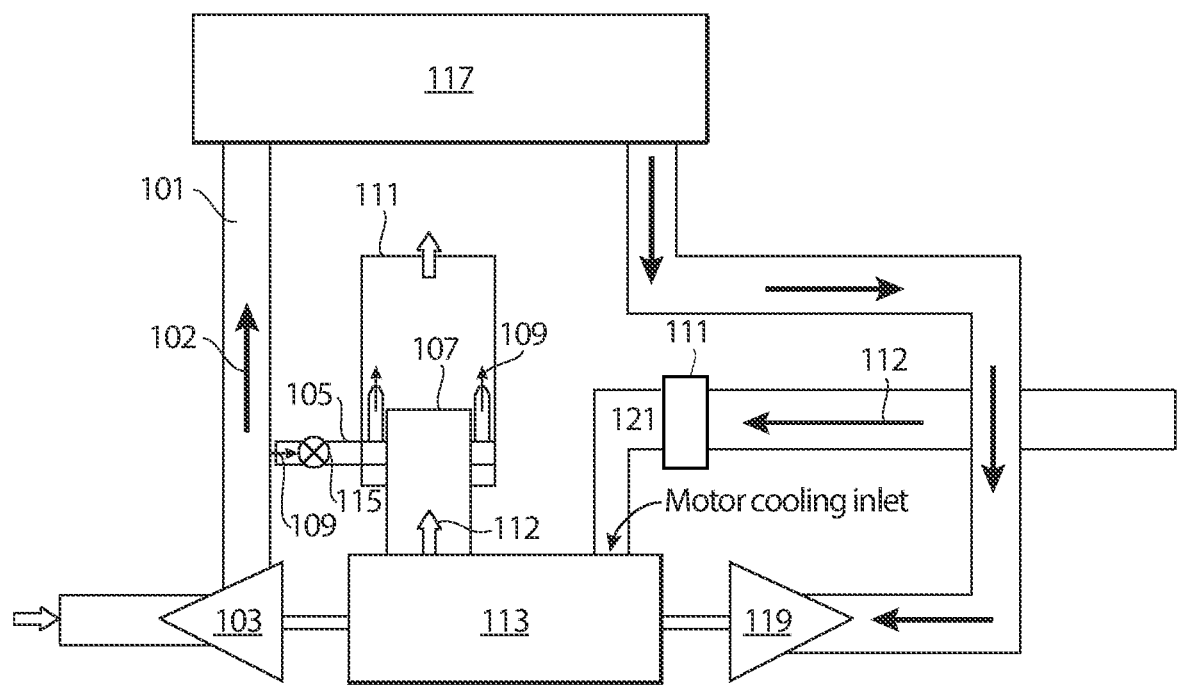
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6. Certain embodiments described herein can be used, e.g., to improve cooling of a motor during ground operation, for example.

Referring to FIG. 1, a system 100 can include a compressor outlet line 101 configured to receive compressor outlet flow 102 from a compressor 103. The system 100 can include a bypass line 105 in fluid communication with the compressor outlet line 101 and a motor outlet line 107 to divert a bypass flow 109 of the compressor outlet flow 102.

Figure 2:
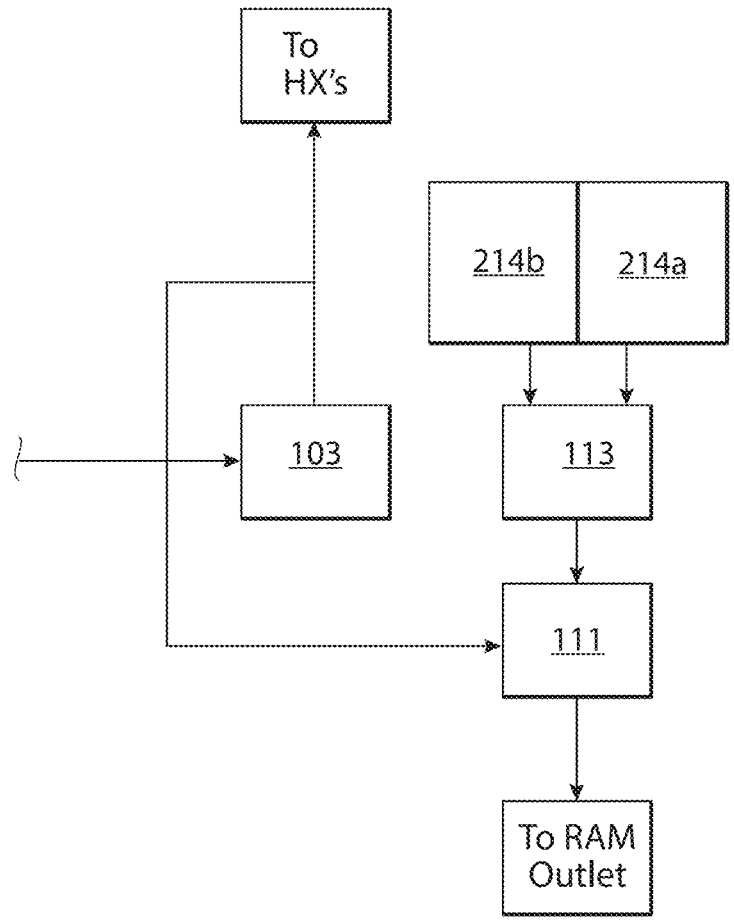
FIG. 2 is a flow diagram of the system of FIG. 1.
Figure 3:
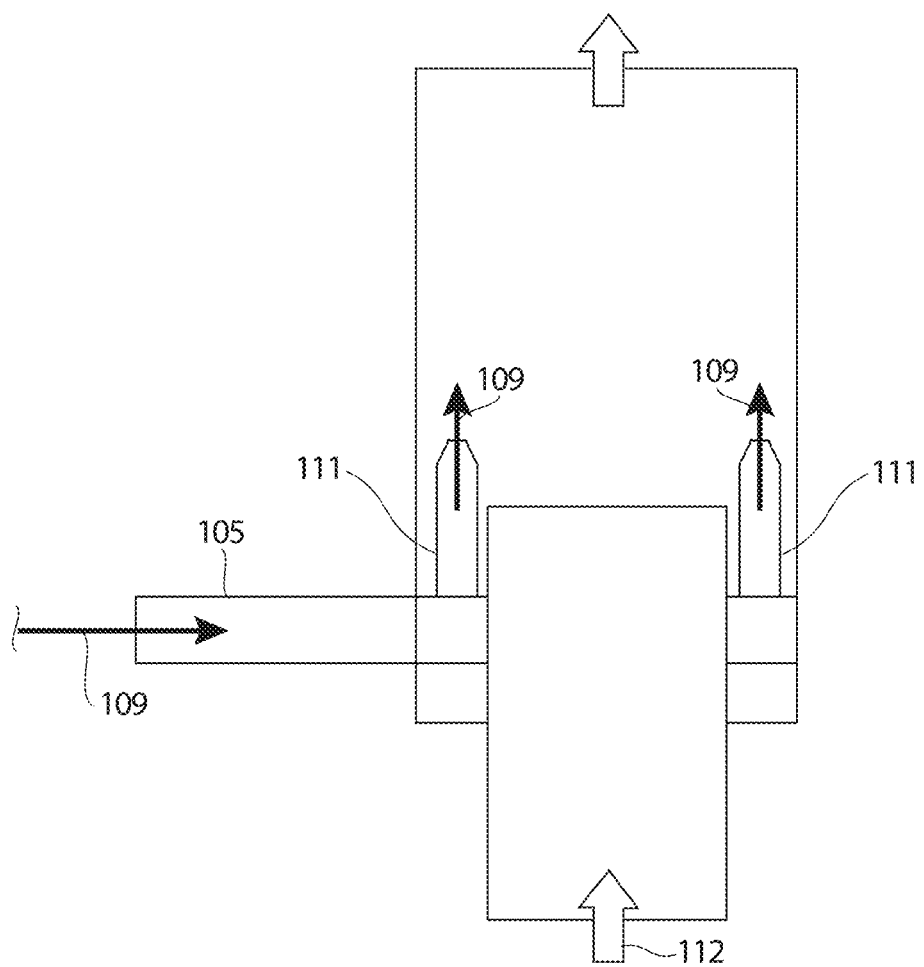
FIG. 3 is a schematic view of an embodiment of at least one pump of the system of FIG. 1.

Referring additionally to FIGS. 2 and 3, the system 100 can include at least one pump 111 in fluid communication between the bypass line 105 and the motor outlet line 107 such that the bypass flow 109 at least partially drives the pump 111 to pull cooling flow 112 through a motor 113 to cool the motor 113. The pump 111 can be connected (e.g., directly or indirectly) to the motor outlet line 107 or disposed within the motor outlet line 107, for example, such that the pump 111 is in fluid communication with a cooling flow outlet of the motor 113.

In certain embodiments, the pump 111 can be a passive pump that has no moving parts. For example, the pump 111 can be an ejector pump (e.g., as shown in FIGS. 1 and 3) configured to create a pressure drop by effusing bypass flow 109 into or downstream of the motor outlet line 107 as shown. Any other suitable pump (e.g., a turbine or any other active pump) is contemplated herein.

The cooling flow 112 can be or include ram air, for example. Any other suitable source for cooling flow for at least a portion of the cooling flow 112 is contemplated herein. For example, it is contemplated that ram air can be the cooling flow 112 for cooling a stator of the motor 113, and gap cooling of the motor 113 can be from a different source (e.g., a heat exchanger pack). The pump 111 can be configured to pull from one or multiple sources of cooling flow 112 (e.g., only the ram air and not pack flow, both ram air and pack flow). For example, as shown in FIG. 2, the pump 111 pulling from a ram air source 214a to cool a stator and from a pack source 214b to provide gap cooling.

In certain embodiments, the system 100 can include at least one valve 115 disposed between the compressor outlet line 101 and at least a portion of the bypass line 115. For example, the valve 115 can be disposed on the bypass line 105 as shown.

The valve 115 can be configured to modify bypass flow 109. For example, the valve 115 configured to turn bypass flow 109 on or off. In certain embodiments, the valve 115 can be configured to meter bypass flow 109 (e.g., to be able to produce any desired amount of bypass flow 109).

In certain embodiments, the system 100 can include the motor 113 and the compressor 103. The compressor 103 can be connected to the motor 113 to be driven by the motor 113, for example. In certain embodiments, the system 100 can include a heat exchanger 117 (e.g., a heat exchanger pack) in fluid communication with the compressor outlet line 101, e.g., to receive compressor outlet flow 102 for transferring heat from the compressor outlet flow 102.

In certain embodiments, the system 100 can include a second compressor 119 connected to the motor 113 to be driven by the motor 113 and in fluid communication with the heat exchanger 117 to receive flow from the heat exchanger 117. In certain embodiments, the system 100 can include a ram air inlet line 121 in fluid communication with the motor 113 (e.g., at a cooling flow inlet of the motor 113) such that air passes from the ram air inlet line 121, through the motor 113, to the motor outlet line 107 to receive heat at least from motor stator windings, for example.

Any other suitable arrangement of cooling flow lines, pumps, valves, and/or any other suitable components are contemplated herein. For example, it is contemplated that the pump 111 can be disposed in the ram air inlet line 121 in addition to or instead of downstream of the motor 113 as shown. Any suitable number of pumps, valves, and flow paths are contemplated herein.

Any suitable system 100 can be utilized as part of an NGS system for inerting aircraft fuel tanks, for example. Any other suitable use is contemplated herein.

In accordance with at least one aspect of this disclosure, a method can include bleeding compressor air from a compressor outlet line to drive at least one pump configured to pull cooling flow through a motor. The method can include driving a compressor in fluid communication with the compressor outlet line using the motor. The pump can be any pump disclosed herein, e.g., described above, for example.

In certain embodiments, the method can include controlling at least one valve to modify an amount of bleeding of compressor air. In certain embodiments, the method can include pulling ram air through the motor using the pump.

In certain embodiments, the method can include fully opening the valve on when on the ground. The method can include closing the valve (e.g., at least partially if not fully) when in flight.

Certain embodiments provide motor cooling using ejector based cooling flow generation. Embodiments can utilize bleed from a first compressor to drive the ejector which pulls ram air through. An ejector is a velocity driven pump, e.g., flow is sent through the nozzles of ejector and it creates a pressure drop (e.g., downstream of the motor 113). An ejector can be placed inside ram air ducting connected to an exhaust, for example.

Figure 5:
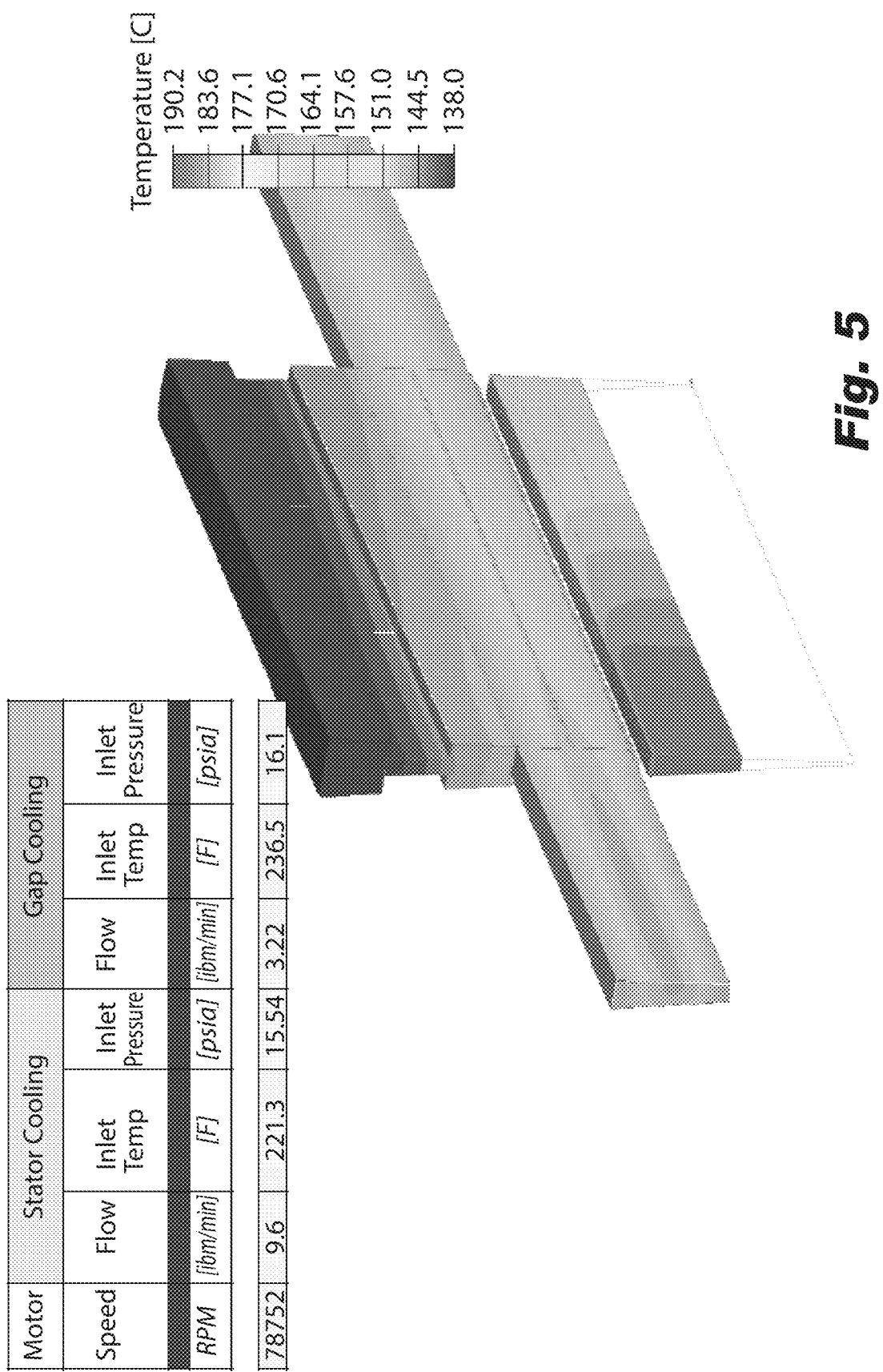
FIG. 5 shows a thermal and flow analysis of a motor using a first cooling system.
Figure 6:
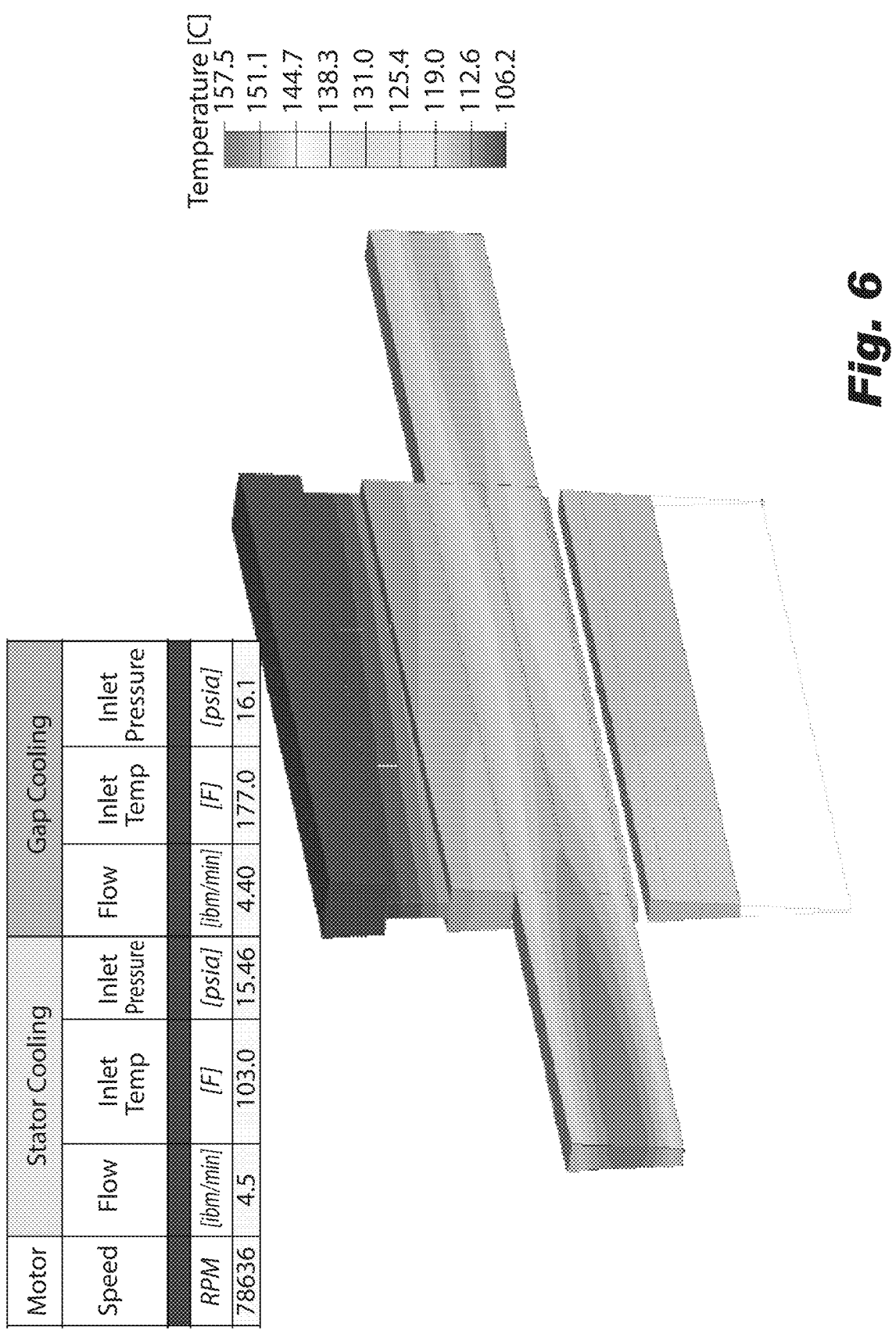
FIG. 6 shows a thermal and flow analysis of a motor using the system of FIG. 1.

Thermal analysis assumptions are shown on FIG. 4. Thermal analyses results are shown in FIGS. 5 and 6. A sea level hot day taxi case was analyzed. Case 1, (shown in FIG. 5) is analyzed with traditional motor cooling configuration. Traditional motors for an NGS system generate 41-42 KW of power, and spins two compressors on the same shaft. The first compressor is larger than the second compressor to extract cooling flow to keep the motor itself cool. The temperature coming out of this compressor is too high to cool the motor stator, and needs to be cooled, so below 1,500 feet, pressurized air from first compressor is cooled in the heat exchanger and used for motor stator and gap cooling. This air is at about 221 degrees F. motor inlet temperature at hot day sea level which results in very high MDC stator winding temperature (e.g., above 180 C). Case 1 assumes about 9.6 PPM cooling flow for stator cooling at inlet temperature of 221 degrees F. Gap cooling flow is assumed at 3.2 PPM at 236 degrees F. inlet temperature. It was shown that the maximum stator temperature was 180 degrees C., and the maximum rotor temperature was 190 degrees C.

Case 2 assumes a configuration in accordance with at least one embodiment of this disclosure (e.g., an ejector based motor cooling configuration). Assuming an ejector pump provides about 50% of the flow rate, case 2 (e.g., shown in FIG. 6) is analyzed with ram air flow pulled by a pump through the motor stator. This assumes about 4.5 PPM cooling flow for stator cooling at inlet temperature of 103 degrees F. Gap cooling flow is about 4.4 PPM at 177 degrees F. inlet temperature. In this case, the maximum stator temperature was seen to be 158 degrees C., and the maximum rotor temperature was seen to be 140 degrees C.

Maximum stator temperature was reduced by 22 degrees C., and rotor temperature decreased by 50 degrees C. For example, even for a very hot day where ram air inlet air can be 103 degrees F., it is still a significant reduction from 221 degrees F. inlet temperature of cooling flow used in traditional systems. Even with motor cooling airflow assumed to be reduced based on ejector efficiency, embodiments still perform better than traditional systems.

As can be seen in the results compared to a traditional system (e.g., shown in FIG. 5), certain embodiments of this disclosure (e.g., as shown in FIG. 6) can utilize airflow from ram air which is significantly cooler than the cooling flow source used by the traditional system and makes the entire system more efficient. Embodiments can allow ram air to be used for motor cooling for the entire range of altitudes of an aircraft. Embodiments also provide a gap cooling flow increase and a gap cooling inlet flow temperature reduction, which provides additional benefit to motor cooling.

Embodiments require lower power to drive the motor, and thus, less heat is generated which allows a lighter, smaller system overall. The motor input power can be reduced from 34 kW to 30.6 kW, which means lower motor loss and lower motor winding temperature. In addition, lower electrical power consumption will increase efficiency of the NGS system. This reduction of motor power has not been incorporated in thermal analysis. Incorporation of reduced motor power in thermal analysis will result in further reduction in motor winding temperature than what is shown in FIGS. 4-6. Embodiments also do not require the complex multiple valve/flow path scheme of traditional systems.

Embodiments provide an improved thermal performance and higher reliability of NGS MDC motor. A 22 degree C. reduction increases reliability by about 4 times.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
 a compressor outlet line configured to receive compressor outlet flow from a compressor;
 a bypass line in fluid communication with the compressor outlet line and a motor outlet line to divert a bypass flow of the compressor outlet flow;
 at least one pump in fluid communication between the bypass line and the motor outlet line such that the bypass flow at least partially drives the pump to pull cooling flow through a motor to cool the motor, the motor and the compressor connected to the motor to be driven by the motor; and
 a ram air inlet line in fluid communication with the motor such that air passes from the ram air inlet line, through the motor, to the motor outlet line to receive heat at least from motor stator windings, wherein the pump is disposed in the ram air inlet line.

2. The system of claim 1, wherein the pump is a passive pump that has no moving parts.

3. The system of claim 2, wherein the pump is an ejector pump configured to create a pressure drop by effusing bypass flow into or downstream of the motor outlet line.

4. The system of claim 1, wherein the cooling flow is ram air.

5. The system of claim 1, further comprising at least one valve disposed between the compressor outlet line and the bypass line, wherein the valve is configured to modify bypass flow.

6. The system of claim 5, wherein the valve is disposed on the bypass line.

7. The system of claim 5, wherein the valve is configured to turn bypass flow on or off.

8. The system of claim 5, wherein the valve is configured to meter bypass flow.

9. The system of claim 1, further comprising a heat exchanger in fluid communication with the compressor outlet line.

10. The system of claim 9, further comprising a second compressor connected to the motor to be driven by the motor and in fluid communication with the heat exchanger to receive flow from the heat exchanger.

\* \* \* \* \*